United States Patent [19]

Rambow et al.

[11] Patent Number: 5,212,353
[45] Date of Patent: May 18, 1993

[54] TRANSDUCER SYSTEM FOR USE WITH BOREHOLE TELEVIEWER LOGGING TOOL

[75] Inventors: Frederick H. K. Rambow; Rocco DiFoggio, both of Houston, Tex.

[73] Assignee: Shell Oil Company, Houston, Tex.

[21] Appl. No.: 682,728

[22] Filed: Dec. 17, 1984

[51] Int. Cl.$^5$ .................... G01V 1/40; H01L 41/10
[52] U.S. Cl. .................... 181/106; 367/35; 367/912; 310/367; 310/369; 73/642
[58] Field of Search ............... 367/35, 68, 150, 155, 367/157, 912; 310/367, 369, 371; 181/104, 106; 73/642, 644

[56] References Cited

U.S. PATENT DOCUMENTS

| | | | |
|---|---|---|---|
| 2,399,820 | 5/1946 | Morgan | 310/369 |
| 2,447,061 | 8/1948 | Franklin | 310/369 |
| 2,503,831 | 4/1950 | Mason | 367/150 |
| 2,645,727 | 7/1953 | Willard | 310/369 |
| 3,369,626 | 2/1968 | Zemanek | 367/68 |
| 3,511,334 | 5/1970 | Zemanek | 181/0.5 |
| 4,044,273 | 8/1977 | Kanda et al. | 367/150 |
| 4,184,094 | 1/1980 | Kopel | 310/371 |
| 4,255,798 | 3/1981 | Havira | 367/35 |
| 4,276,491 | 6/1981 | Daniel | 310/371 |
| 4,382,290 | 5/1983 | Havira | 367/35 |
| 4,387,720 | 6/1983 | Miller | 73/642 |

FOREIGN PATENT DOCUMENTS 450605  9/1969  Australia .
1169541  6/1984  Canada .
12938    7/1980  European Pat. Off. .
2133882  8/1984  United Kingdom .

OTHER PUBLICATIONS

Heard, F. E.; "Upgrading the Acoustic Borehole...", Sep. 11, 1980, pp. 341–344, vol. 4, Ann. Geo. Rec. Mtg., abst. attached.

Hartmann, "Ultrasonic Properties...", Jan. 1980, pp. 310–314, J. Appl. Phys., vol. 51, #1, abst. supplied.

Fedosov et al, "Piezoelectric Ceramic Pressure...", Aug. 1974, pp. 1185–1187, Measurement Tech., vol. 17, #8.

Weyms, "Radiation Field Calculations...", Sep. 1980, pp. 219–223, Ultrasonics, vol. 18, #5, abst. supplied.

Journal of Acoustical Society of America, vol. 68, No. 1, Jul. 1980, pp. 85–92, F. S. Foster: "Cylindrical Transducer Scatter Scanner".

IEEE Transactions on Biomedical Engineering, vol. BME-30, No. 8, Aug. 1983, pp. 453–481, J. W. Hunt: "Ultrasound Transducers for Pulse-Echo Medical Imaging".

*Primary Examiner*—Nelson Moskowitz

[57] ABSTRACT

A focused acoustic transducer for use with a borehole televiewer wherein the transducer is provided with a concaved surface designed to focus the acoustic energy and reduce the energy present in the side lobes of the near field.

2 Claims, 3 Drawing Sheets

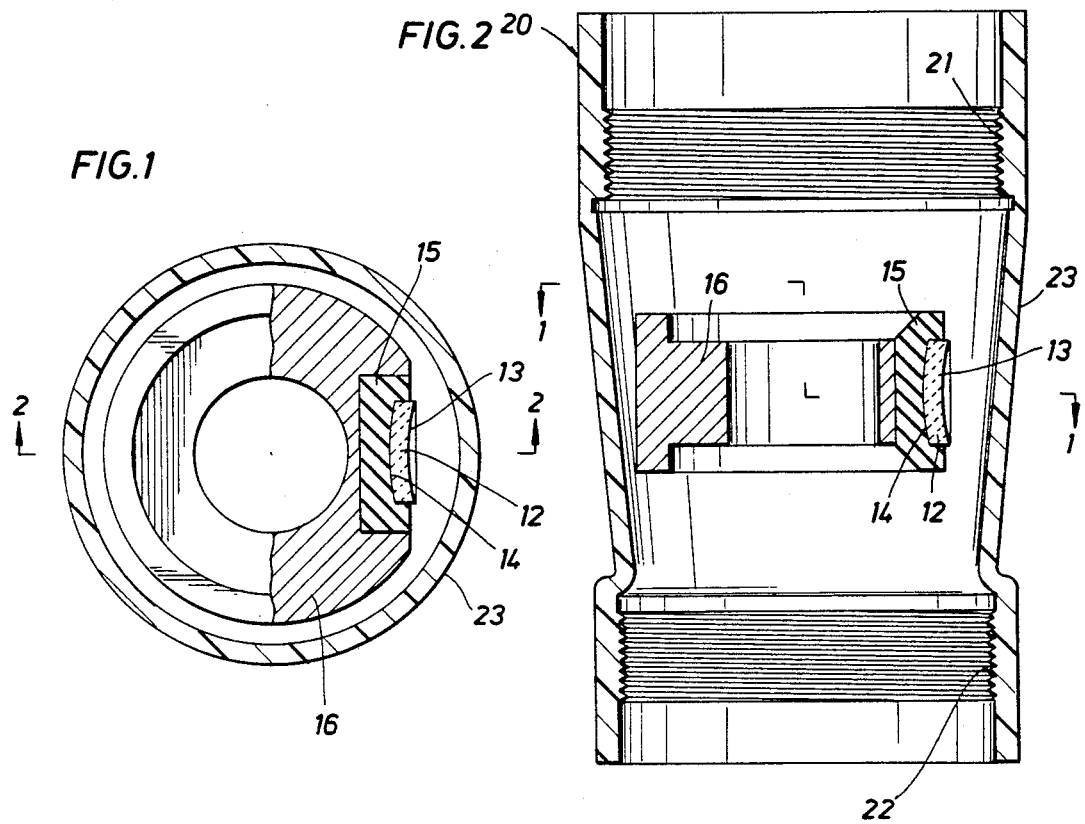
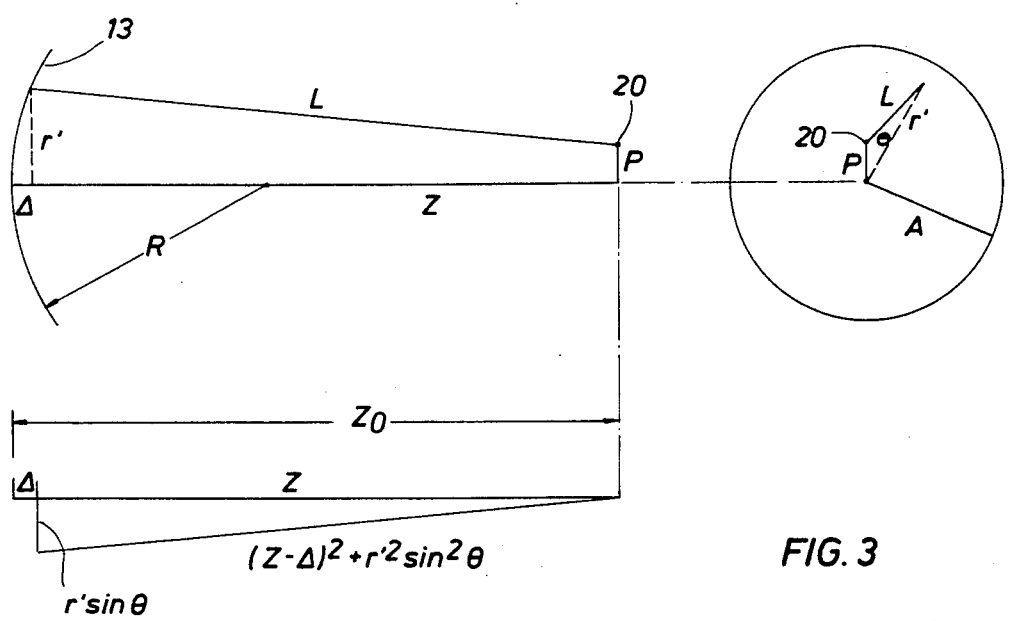

TRANSDUCER SYSTEM FOR USE WITH BOREHOLE TELEVIEWER LOGGING TOOL

BACKGROUND OF THE INVENTION

The present invention relates to logging tools and particularly to a borehole televiewer tool (BHTV) such as described in U.S. Pat. No. 3,369,626. This patent describes a logging tool in which a rotating acoustical transducer is pulsed to produce acoustic waves which travel through the borehold fluid and are reflected from the wall of the borehole back to the transducer. Various characteristics of the reflected signal are recorded and displayed to provide an indication of the surface of the borehole. For example, the amplitude of the reflected signal can be displayed on a cathode ray tube which is periodically photographed to provide a picture of the wall of the borehole unfolded to a flat surface. The tool has proven useful in locating fractures in formations penetrated by the borehole, as well as locating corrosion in casing which has been installed in the borehole. The tool has also been adapted to provide a caliper type measurement of the borehole so that enlarged sections of the borehole can be located. A display system that incorporates the above features is described in U.S. Pat. No. 4,463,378.

While the tool has proven useful it does have limitations when run in boreholes containing heavy weight drilling muds. Heavy weight muds are used in the many areas, particularly in the Gulf Coast area of the United States, where the drilling of geopressured formations is common. Heavy weight muds tend to absorb and scatter the acoustic signal and limit the ability of the tool to investigate the borehole wall.

A possible solution to the problem is to use lower frequencies to provide acoustic waves that can better penetrate the drilling mud. The use of lower frequencies requires larger transducers to focus the acoustic energy. Since the transducer is mounted in the tool and rotated to scan the complete borehole wall, there is a physical limitation on the size of the transducer that can actually be mounted in the tool. If lower frequencies are used without enlarging the transducers, the beam width defined as the full width at half height of the primary lobe becomes very large, increasing the spot size and reducing the resolution.

BRIEF DESCRIPTION OF THE INVENTION

In order to keep the same beam width, one must keep approximately the same ratio of transducer radius A to wavelength $\lambda$. However, for flat transducers with a given $A/\lambda$ ratio as one increases A and decreases $\lambda$, the complicated near field region moves farther out from the transducer making it unusable for imaging in small boreholes, i.e., close to the transducer. As explained below, there is actually a null in the sound pressure along the axis of the transducer. For a flat transducer with a radius of 0.75 inches and an operating wavelength (in water) of 0.15 inches or 400 kHz, this null occurs more than 2 inches from the face of the transducer. It has been discovered that with the addition of curvature to the transducer, this near field is brought in closer allowing it to image in a borehole at least 2 inches smaller in diameter than otherwise possible.

By reducing the frequency one can improve the mud penetration and if the diameter of the transducer is increased accordingly and the transducer is curved, the resolution and near transducer imaging resolution will not suffer. Furthermore, the addition of curvature increases dramatically the ratio of energy in the primary lobe at the expense of energy in the secondary lobes at distances up to the focal length. This also improves the efficiency and helps mud penetration.

A further improvement in the ability of the acoustic waves to penetrate heavy drilling muds is obtained by a particular design of the acoustic window that isolates the transducer from borehole fluids in the BHTV. The acoustic window must be a good acoustic match with the borehole fluids and strong enough to provide protection to the rotating transducer system. It has been discovered that a polymethylpentene material has acceptable strength up to temperatures of 125° C. and acoustically matches most drilling muds. This material is sold under the trade name TPX and is manufactured by Mitsui Petrochemical in Japan and by Imperial Chemical Industries, Ltd., in Great Britain. It has also been discovered that improved results are obtained by inclining the surface of the window in place of the more conventional cylindrical shaped window.

BRIEF DESCRIPTION OF THE DRAWINGS

The invention will be more easily understood from the following detailed description when taken in conjunction with the attached drawings in which:

FIG. 1 is a plan view shown in section of a transducer and acoustic window constructed according to the present invention.

FIG. 2 is a vertical section taken along line II—II of FIG. 1.

FIG. 3 is a schematic side view and end view of the transducer showing the dimensions used in calculating the pressure produced by the transducer at any particular point.

DESCRIPTION OF PREFERRED EMBODIMENTS

Figure 4:
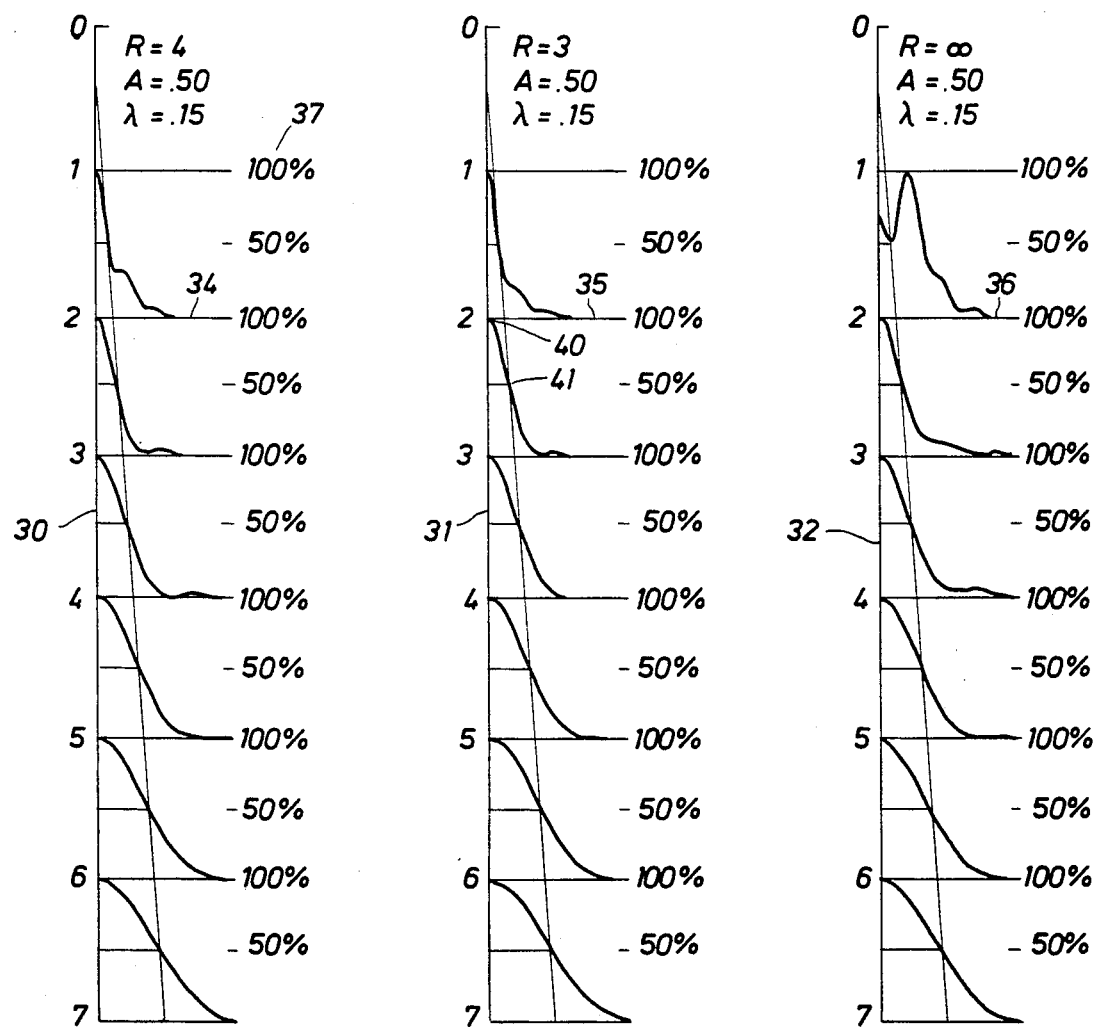
FIGS. 4 and 5 illustrate the power profile at various distances from the transducer for three different transducer configurations and two frequencies.

Referring to FIGS. 1 and 2 there is shown a concave transducer and acoustical window constructed according to the present invention with the transducer being mounted in the rotating head of the borehole televiewer of the type described in the above referenced patent. Not shown are the means for mounting the rotating head, the rotation means or the remainder of the tool. The details of the logging tool and its construction are described in more detail in the above referenced patent and various publications well known to those skilled in the art. The transducer comprises a spherical piezoelectric element 12 which has a concave front surface 13 facing outwardly toward the formation and a surface 14 on the opposite side facing the center of the logging tool. The transducer is mounted in an opening in the rotating head 16 and is backed by a suitable sound absorbing material 15 to reduce the backscattering of energy from the transducer. The transducer and backing member are mounted as a unit in the rotating head 16 of the BHTV. The transducer is preferably a piezoelectric type which has a spherical shape and a constant thickness and dimensions within the range described in more detail below. The transducer must have a uniform thickness so that the pressure waves produced by the transducer are in phase.

The acoustic window 20 is shown in FIG. 2 and comprises a generally cylindrical shaped member formed of TPX described above. The window is provided with internal threads 21 and 22 at each end so that it may be secured to the remainder of the logging tool housing. The central portion of the window is provided with an inclined or frustoconical surface 23 with respect to the transducer. The frustoconical surface has the ability to reflect energy away from the transducer and thus decreases the ringdown time or the tail caused by multiple reflections between the mud and transducer. In cases where the acoustic match between the fluid filling the logging tool, the acoustic window and the drilling mud is close, ringdown is not a problem. In heavier oil-based muds the mismatch plus the attenuation of the heavier mud has precluded using a BHTV logging tool. The above described window having an angle of about 4 degrees with respect to the longitudinal axis as allowed the BHTV to be successfully used in wells having a 11.8 ppg oil-based mud. The term ppg means pounds per gallon and is used to describe the weight of the drilling fluid or mud and normal fresh water muds are in the range of 8.5 to 9 ppg. While an angle of 4 degrees was used, angles in the range of 3 to 5 degrees could also be used.

Referring to FIG. 3 there is shown the transducer surface 13 and the various dimensions used in calculating the pressure produced by the transducer at any point 20 in space. Using the dimensions shown in FIG. 3 and equation (1) shown on page 184 of an article by J. Zemanek entitled "The Beam Behavior Within the Near Field of a Vibrating Piston" published in the Journal of the Acoustical Society of America, volume 49, page 181 et. seq. the following equation for the pressure P can be written:

$$p = C \int_o^A \int_o^{2\pi} r' \, dr' \, d\theta \, \frac{e^{i(\omega t - kL)}}{L}$$

In the above expression, L is equal to the following:

$$L = [r'^2 + p^2 + Z^2 - 2r'p \cos\theta]^{\frac{1}{2}}$$

The following equation can also be written:

$$Z = Z_o - R + R^2 - r'^2$$

where
 R = radius of curvature of transducer
 r' = integration variable
 θ = integration variable
 Z and P = polar coordinator of the point 20

From the above it can be shown that as R approaches infinity, the results obtained match the results published in the Zemanek article for a flat plate type transducer. Using the above expressions, one can calculate the pressures produced in the space in front of the curved disc and obtain the result shown in FIG. 4.

In FIG. 4 there are shown the power plots of three transducers of 1.00-inch diameter; the left transducer having a 4-inch radius of curvature and the right transducer having an infinite radius of curvature. Further, all of the transducers were excited at a frequency of 400 kHz. The vertical lines 30, 31 and 32 in FIG. 4 represent the axes of the transducers, the numbers, for example 33, represent distances in inches from the face of the transducer and the horizontal lines, for example 34, 35 and 36, represent horizontal distances from the axis of the transducer. The series percentages 37 represent the percent of power that is present at a point on a plane spaced the distances 30 from the transducer. Of course, the 100 percent power level for the plane 2 inches from the transducer face is the 0 power level for the plane 1 inch from the transducer face. For example, the curve 40 illustrates that in a plane 2 inches from the transducer face, 100 percent of the power is on the axis of the transducer. In contrast, the point 41 shows that only 50 percent of power is present at a point on the plane positioned to one side of the transducer axis. From an inspection of the 50 percent power beam of the transducers shown, it is seen that the transducers having a spherical radiating surface retain at least 50 percent of their power in this beam even at distances of 2 and 3 inches from their face. In fact, in the most useful operating range, i.e., 3 to 5 inches from the transducer face, the transducers with the spherical radiating surface produced outstanding results in which most of the power is concentrated within a 4.2° beam.

Figure 5:
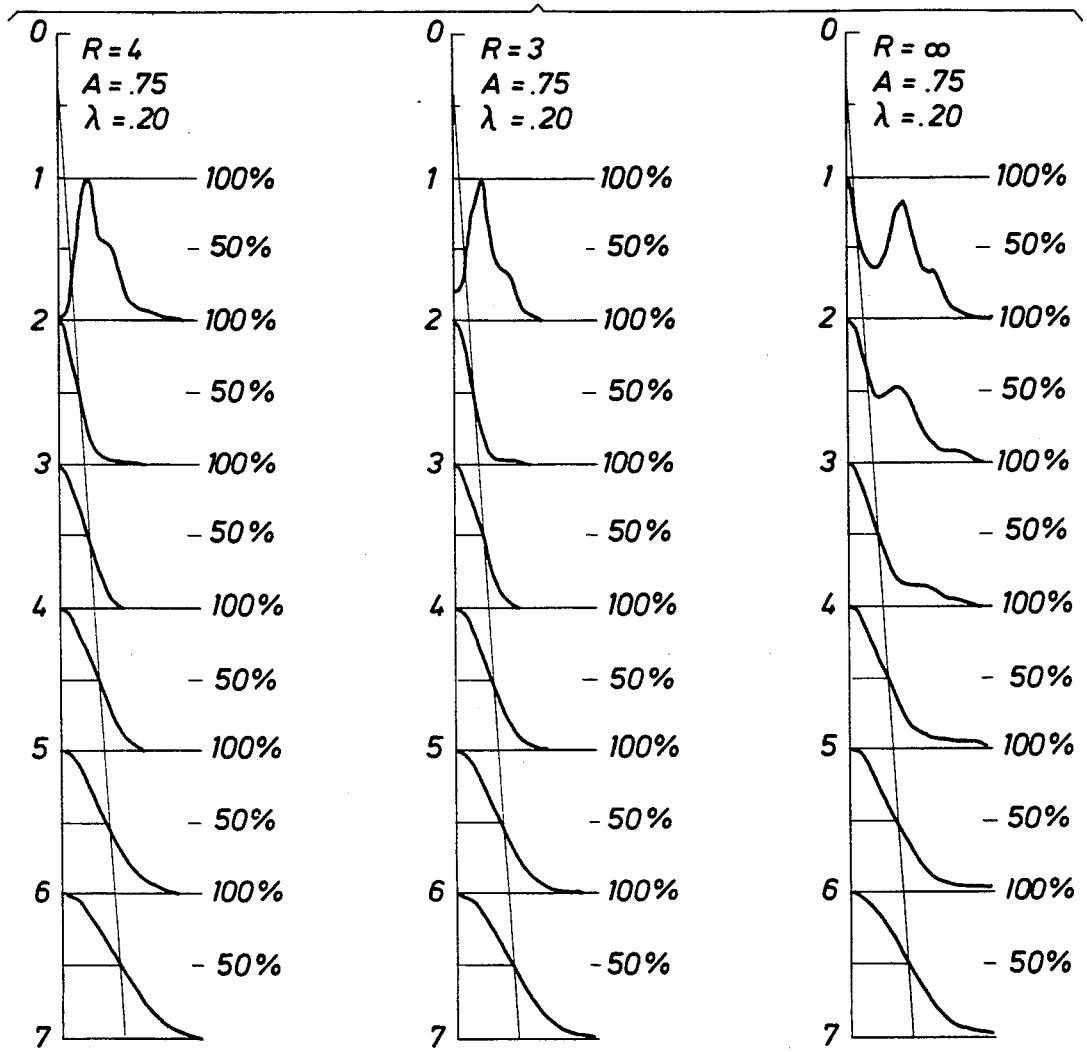

FIG. 5 represents the power spectrum of three transducers having a 1.50 inch diameter and excited at 300 kHz. The transducer on the left has a 4-inch radius of curvature, the center transducer has a 3-inch radius of curvature, while the transducer on the right has an infinite radius of curvature. The remainder of FIG. 5 is the same as described above for FIG. 4. From FIG. 5 it is obvious that the two spherical portions of their power within a small beam of 4 degrees over the useful operating range of 2 to 5 inches. In contrast, the flat transducer has considerably less power in a 4 degree beam at 2 and 3 inches from the transducer face. The absence of energy in the side lobes of the spherical transducer ensures that the interference will be reduced while still using a relatively low frequency of 300 kHz that produces acoustic energy more adapted for travel or transmission through the heavy drilling muds. In contrast, a flat transducer has considerably less than 50 percent of its power in this beam at distances of 2 or 3 inches from the transducer face.

Figure 6:
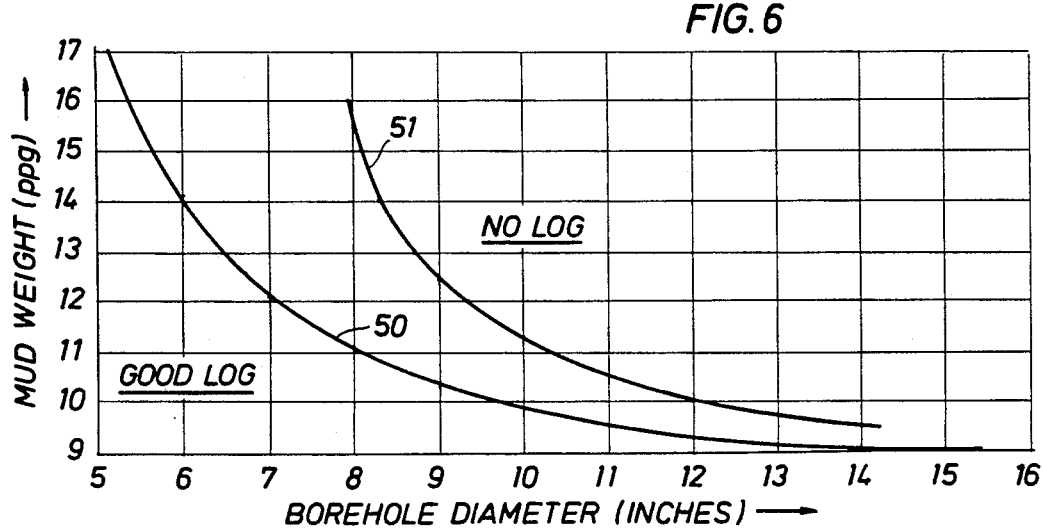
FIG. 6 is the performance for various transducers, mud weights and borehole diameters.

Referring to FIG. 6 there is shown a plot of a BHTV performance using the old flat plate transducer as illustrated in FIGS. 4 and 5 and the new spherical transducer in combination with the inclined window as illustrated by the curve 51. As is readily apparent, the new transducer results in good logs in much heavier muds and larger boreholes.

What is claimed is:

1. An improved transducer system for a borehole televiewer operating in heavy mud comprising:
 a spherical transducer operating at a frequency of 250–350 kHz, having a radius of between 2.5 and 4.5 inches and having a A/λ ratio of at least two, said transducer being mounted in a sound absorbing mount and disposed for rotation about the axis of the televiewer; and
 a cylindrical acoustic window formed of polymethylpentene, said window being disposed to surround said transducer, the wall of said window being inclined at an angle of 3 to 5 degrees with respect to the axis of the cylinder.

2. The transducer system of claim 1, wherein the transducer has a constant thickness.

* * * * *